Aug. 28, 1934.    R. BYRON ET AL    1,971,766
BAKING OVEN
Filed March 22, 1933    4 Sheets-Sheet 2
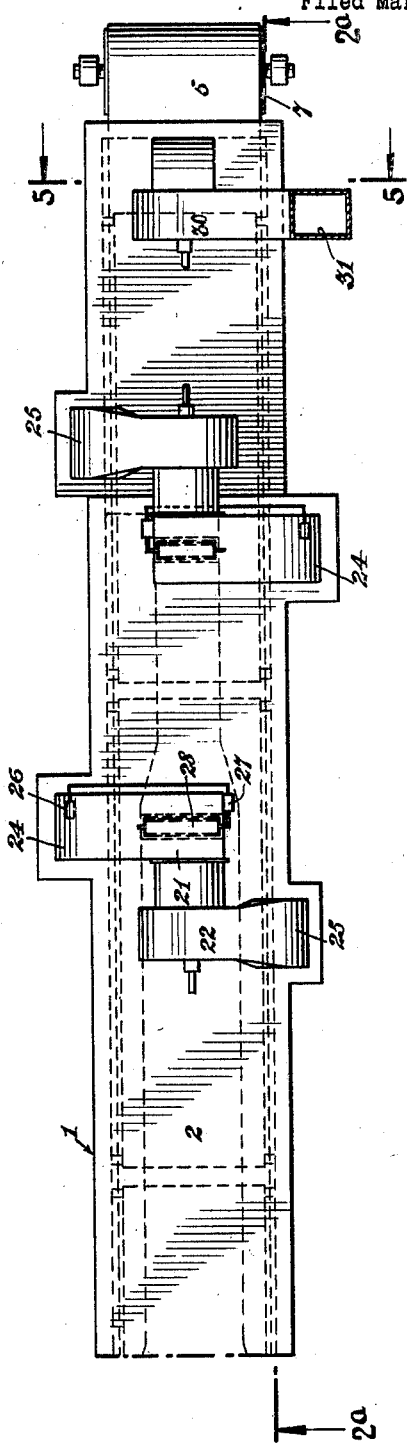
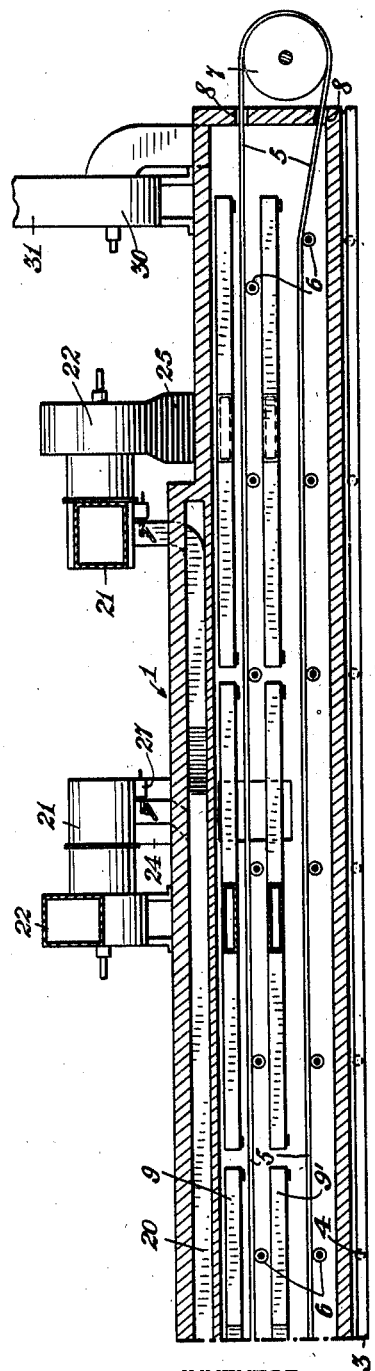
INVENTOR
Ralph Byron
Herman J. Rappolt
BY
C. Campbell Hunicke
ATTORNEY

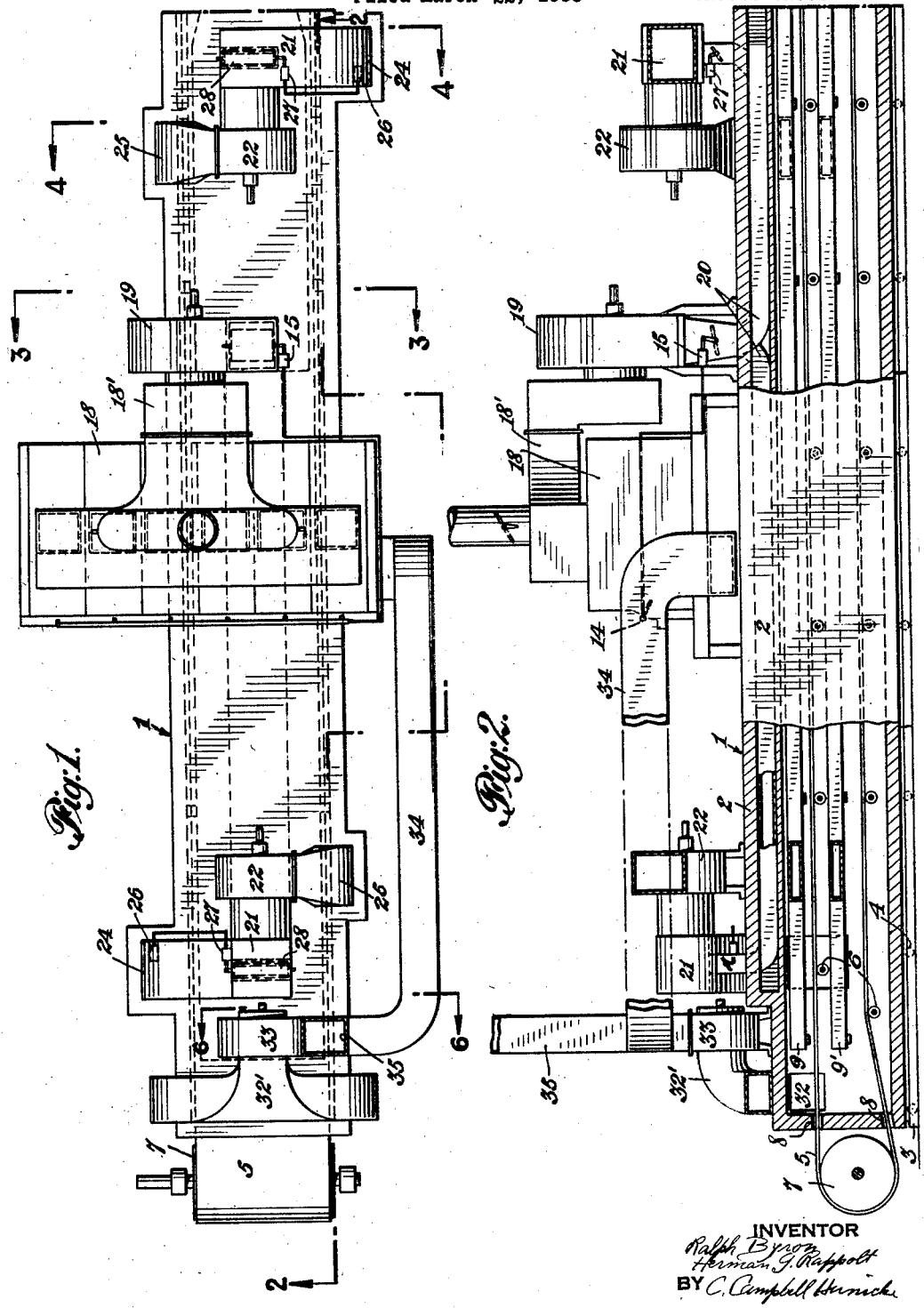

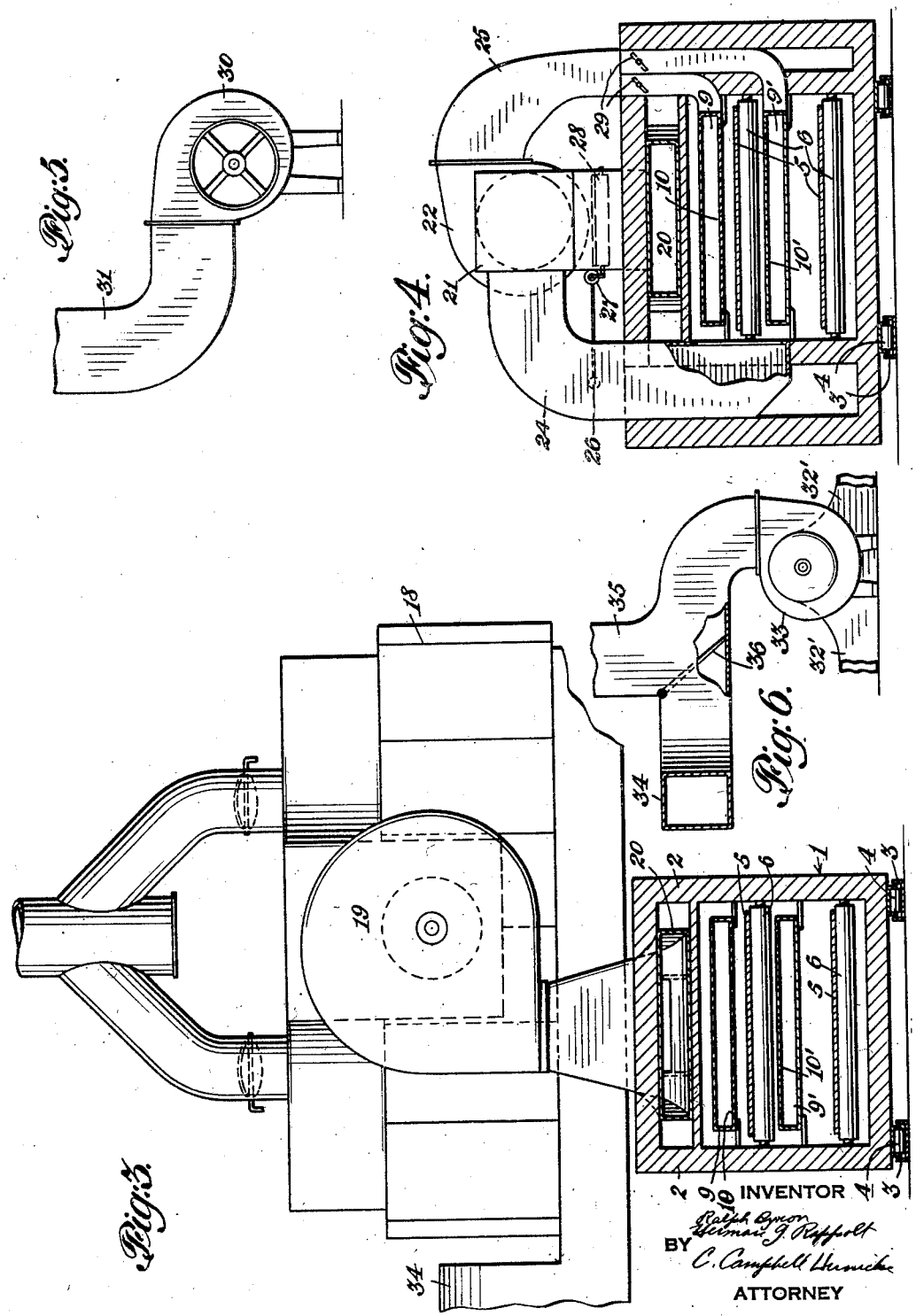

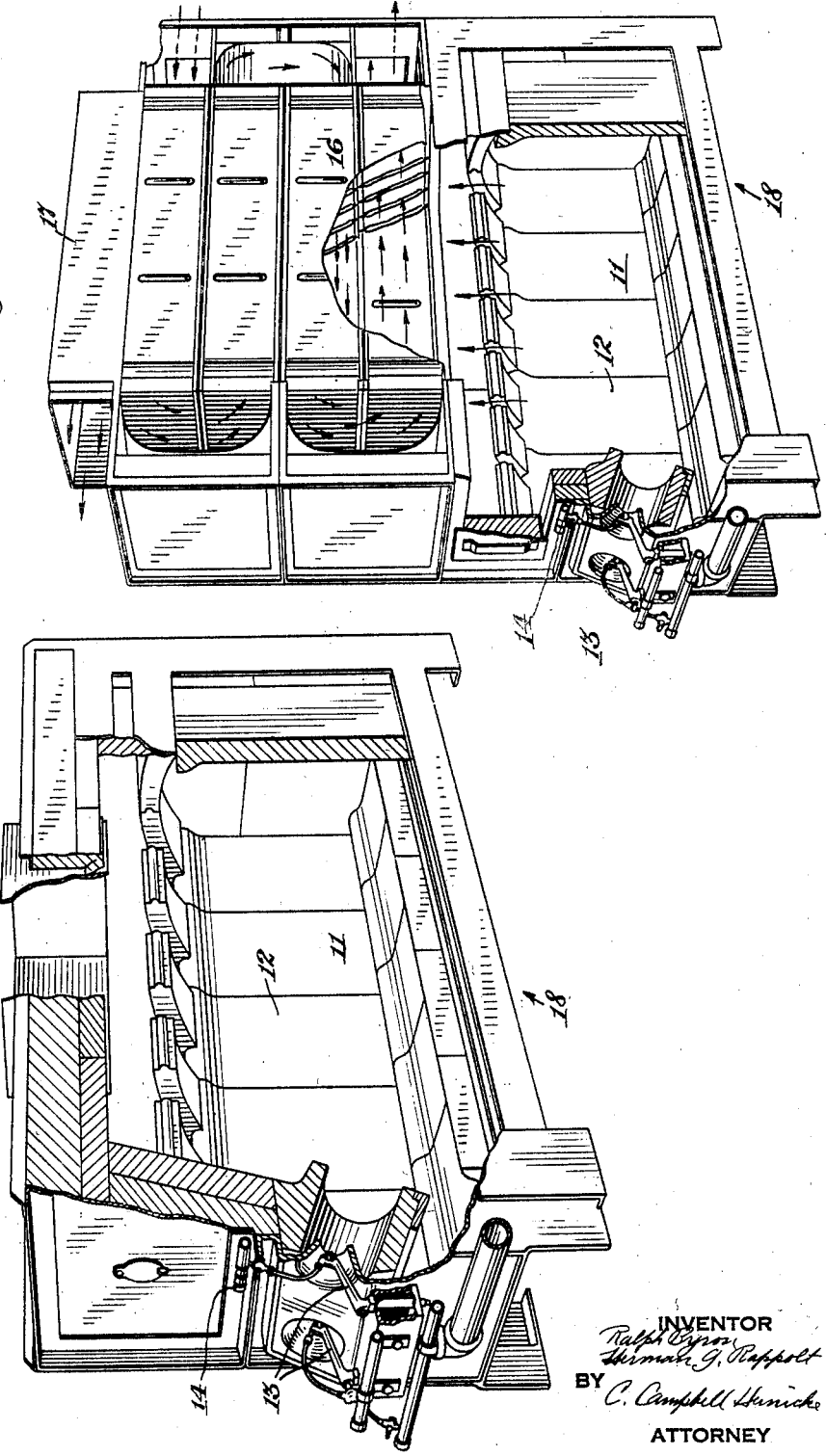

Patented Aug. 28, 1934

1,971,766

UNITED STATES PATENT OFFICE 1,971,766

BAKING OVEN

Ralph Byron, Jersey City, N. J., and Herman G. Rappolt, New York, N. Y., assignors to J. O. Ross Engineering Corporation, New York, N. Y., a corporation of New York Application March 22, 1933, Serial No. 662,068

11 Claims. (Cl. 107—57)

This invention relates to a baking oven.

It has been customary in ovens for baking bread, biscuits, crackers, etc., to use direct flame in the oven as heating medium or to circulate within the oven through tubes superheated steam or gases.

The baking of foodstuffs is different than other types of baking in that it is frequently desirable to brown the surface of the product. This browning is accomplished primarily by three forms of heating by conduction, that is, where the product rests directly on the heating surface such as in the case of frying and frying pans, cooking of flapjacks on hot plates; or by the use of radiant heat in the oven of an ordinary coal stove or by the use of the products of combustion in a gas oven. Mere temperature alone is not sufficient. Temperature will dry the product and will char or burn it but will not brown the surface. In addition to the necessity of providing one of the three forms of heat that will brown the product, temperature control must be had. Some products require an even temperature, others higher initial temperature, and still others a lower initial temperature and a higher final temperature. In our invention we propose to provide a baking oven that will have zone cóntol of heat and to supply the heat from without the oven. This permits of greater economies of operation in baking plants and separates the heater from the oven itself enabling a single or bank of heaters to furnish the source of heat from a distance to one or more ovens. We further propose to recirculate in each zone of each oven the hot gases, adding from the source of supply automatically additional hot gases to maintain the desired temperature. As there is a slight plenum pressure there is a drift of the heating medium in the oven towards the ends. The moist dough gives off considerable moisture initially. The gases therefore from this end are preferably not recirculated. There is an approximate balance between the heating medium exhausted to the atmosphere and the amount added from the heater.

The objects of our invention are to provide a baking oven which has zones that may be independently controlled as to temperature and volume of heating medium.

A further object of our invention is to provide a baking oven wherein the source of heat is supplied from without the oven from an independent heater.

Still another object of the oven is to utilize a large proportion of the heating medium from the oven and raising the temperature by the addition of fresh heating medium of relatively high temperature and recirculating the medium.

A still further object of the invention is to supply and recirculate the heating medium at individual stations of the oven.

Another object of the invention is to increase the efficiency and reduce the operating costs of ovens.

Referring to the drawings:

Figure 1 is a plan view of the left hand half of an oven embodying the principles of our invention.

Fig 2 is a sectional view along the line 2, 2, partly in elevation of Figure 1.

Figure 1a is a plan view of the other half of the oven.

Figure 2a is a sectional view along the line 2a, 2a, of Figure 1a looking in the direction of the arrows.

Figure 3 is a sectional view partly in elevation along the line 3, 3, of Figure 1.

Figure 4 is a sectional view partly in elevation along the line 4, 4, of Figure 1 looking in the direction of the arrows.

Figure 5 is a sectional view partly in elevation along the line 5, 5, of Figure 1a.

Figure 6 is a view partly in section and partly in elevation along the line 6, 6, of Figure 1 looking in the direction of the arrows.

Figure 7 is a view partly in section and partly in elevation of a direct type of heater that may be used in connection with our invention.

Figure 8 is a view of an indirect heater having parts broken off and in section illustrating an indirect type of heater that may be used in connection with our invention.

In carrying out our invention, we propose to provide an oven 1 having walls 2 with metallic tracks or channels 3 to support on rollers 4 the oven and to permit of expansion and contraction of the oven. A travelling belt 5 passes through the oven over rollers 6 and is operated by pulleys 7 which may be driven in any well known manner. Openings 8 in the ends of the oven permit the entrance and exit of the belt with the products being baked thereon to pass through. The righthand side (Figures 1a and 2a) forms the entrance side of the oven and the lefthand side (Figures 1 and 2) forms the exit side. The products are placed on belt 5 and pass with the belt through openings 8 at the righthand end and between ducts 9, 9'. Ducts 9, 9', extend across the interior of the oven the entire width and have openings 10 in the bottom of duct 9 and openings 10' in the top of 9' to blow the heating medium on both sides of the travelling belt or web 5 upon which the material being baked is placed. It should be noted that the heating medium impinges upon the material being baked vertically, or at any other angle. The openings 10, 10' extend uniformly in spaced relationship across the oven for uniform distribution. Ducts 9, 9', not only extend across the interior width of the oven but substantially the interior length of the oven. Ducts 9, 9', are preferably formed in separate sections as shown in Figure 2a. We have shown belt 5 passing nearer upper duct 9 in order that the materials might brown more on top. The location of belt 5 with respect to ducts 9, 9', may be varied either in the initial construction of the oven or by adjustable supporting means for rollers 6.

The most common forms of baking ovens are gas heated. In our invention as the heating medium is heated outside of the oven any form of heater may be used. We have shown two forms of oil heaters that might be used. Figure 7, shows a direct fired oil heater. The heater has a combustion chamber 11 lined with refractory tile 12. The burners 13 are the atomizer type, the temperature being controlled by the air supply line 14 which in turn is controlled by a thermostat control 15. This type of heater permits of the use of oil or gas with freedom from soot and smoke thereby enabling the direct products of combustion or the heating medium to be used for baking purposes. Where the indirect type is required or desired the heat interchanger such as the one shown in Figure 8 may be used. The heat interchanger consists of a series of tubes 16 having passages between them for the upper travel of the products of combustion and for the longitudinal or horizontal travel of the air being heated, the products of combustion passing out of the heat interchanger at the top through stack 17 the entering air passing in at the top row of tubes and out through the bottom row. We do not claim the construction of the heater or heat interchanger as parts of our invention. The type of heater 18 shown, however, permits of its location upon the top of the oven due to the lightness of heater 18 and thereby enabling the saving of floor space by permitting ovens to be placed alongside of one another and one heater 18 may furnish sufficient heat for one or more ovens. The use of heating medium from an exterior source permits of a different type of heating medium, for instance for some products heat from a direct fired heater may be used, that is, the products of combustion may be used or for different products the indirect type of heater 18 may be used. Heater 18, delivers the products of combustion through conduit 18', main supply fan 19, to conduits 20. The latter conduits are positioned at the top of the oven and extend lengthwise thereof. We propose further to have individual stations where the heating medium is drawn from conduits 20 into mixing chambers 21, where it is mixed with the recirculated heating medium withdrawn from the interior of the oven. Each individual station has a circulating fan 22 to force under plenum pressure the heating medium comprising fresh heating medium and recirculated heating medium into and out through ducts 9, 9', through openings 10, 10', where the heating medium is blown upon the material being baked on travelling web 5. The recirculated heating medium is withdrawn from the opposite side to that of the supply side for ducts 9, 9'. Ducts 24 carry the recirculated medium from the oven to mixing chambers 21 while ducts 25 deliver the heating medium to ducts 9, 9'. Each station from right to left is reversed to prevent unbalanced side drift of the heating medium. Thermostatic elements 26 in ducts 24 through thermostat 27 controls damper 28 in each station and thereby the quantity of hot heating medium to be mixed with recirculated heating medium is controlled. Dampers 29 control the proportion of heating medium to ducts 9, 9'. Dampers 29 are preferably manually operated and require very little adjustment. Dampers 28 are limited in their throw so as not to entirely close to prevent burning up of the heater on starting when there is no heat being absorbed by the baking operation. At each end of the oven we provide means for withdrawing some of the heating medium. At the end (right end) at which the product being baked is inserted the withdrawn heating medium is exhausted to the atmosphere by fan 30 through stack 31. It is inadvisable to recirculate the heating medium at this point as it contains an excess of moisture. At the lefthand end where the product leaves the oven through openings 32 at each side of the oven through ramshorn conduit 32' and fan 33, recirculated heating medium may be withdrawn and delivered to the heater through conduit 34. A portion of the recirculated medium withdrawn from the lefthand end may be exhausted to the atmosphere through stack 35. A damper 36 controls the amount exhausted to the atmosphere. The removal of the heating medium at each end reduces the internal pressure and prevents blasts of the heating medium passing out of the oven through openings 8 and adds an element of economy in that all the available heating medium is recirculated.

An important element of our invention is the separate station units whereby the oven is divided into zones, each zone being independent and separately controlled so that the desired temperature of each zone may be independently maintained. This is automatically accomplished at each station, as previously indicated, by the thermostatic elements 26 and thermostat 27 automatically regulating dampers 28 whereby the amount of high temperature fresh heating medium is controlled.

In starting the oven up for baking fresh heating medium is primarily used to bring the oven to initial temperature and then the fresh heating medium is only required to make up by addition of high temperature heating medium the desired temperature in each zone and to maintain such temperature.

As the volume of air spilled from the oven must equal the volume of air supplied to the zones by the heater, by using a high temperature heating medium we get a larger temperature drop and therefore a smaller volume of heating medium is required, by using a lower temperature heating medium with a lower temperature drop a larger volume of heating medium is required and consequently a larger amount of spill from the oven. Therefore, the amounts of spill from the oven may be varied by varying the temperature of the heating medium. The use of high temperature heat enables greater flexibility and a more efficient control of the oven.

It will thus be seen that each zone temperature may be different from any other zone temperature or the same as desired. In addition the volume of air circulated in each zone may be independently controlled. The volume of air supplied above and below the conveyor may be independently proportioned. The air is blown perpendicularly or at an angle on the material with uniform distribution and the reversal of the station units compensates for any unbalancing due to side exhaust. By the use of high temperature heating medium in small volumes the volume that must be exhausted from the oven is small and as the greater proportion of the exhausted air is recirculated very high economies may be accomplished by the use of our invention. Various modifications in detail of construction may be made and still fall within the scope of our invention. In our invention it is possible within limits to vary the radiant heat and forced convection heat used in baking the product since by increasing the circulated medium temperature and decreasing the volume of air circulated we increase the radiant heat effect and by decreasing the circulated medium temperature and increasing its volume we increase the effect due to forced convection and decrease the radiant heat effect. This makes the oven extremely flexible and desirable for baking purposes since it enables a greater control of the browning effect in addition to the flexibility obtained by the controlled temperature zones. Our oven is primarily adapted for the baking of food stuffs but can be used for other baking or heating or drying purposes.

What we claim is:

1. In an oven, a source of heating medium exteriorly of said oven, means for distributing said heating medium to predetermined delivery points lengthwise of said oven, means for mixing predetermined quantities of said heating medium at said points with withdrawn heating medium from said oven, means for controlling the temperature of the mixture and means for delivering into said oven said controlled mixture of withdrawn and fresh heating medium.

2. An oven, a travelling carrier to carry articles through said oven, means for motivating said carrier, ducts above and below said carrier, holes in said ducts for the passage of heating medium from said ducts and the impingement upon the articles on the carrier at right angles to the direction of travel of said articles, individual mixing and delivering means to said ducts of said heating medium, means for withdrawing spent heating medium from said oven to said individual means, means for delivering from a source of supply exteriorly of the oven fresh heating medium to said individual mixing means, means for controlling the proportion of fresh and withdrawn heating medium at said mixing means.

3. An oven, zones within said oven, a source of heating medium supply for each zone, means for withdrawing spent heating medium from the oven, means for delivering a mixture of said spent heating medium and said heating medium separately to each zone, a central source of fresh heating medium supply, connections between said central source of heating medium supply and said separate means for delivering heating medium to said zones, individual thermostatic controls at each of said separate delivering means to control the proportion of fresh heating medium added to spent heating medium at each zone to maintain at each zone the predetermined temperature.

4. In an oven, means for maintaining zones of predetermined temperature in said oven, means for withdrawing heating medium from said oven, a source of fresh heating medium supply exteriorly of said oven, a plurality of means for adding predetermined amounts of fresh heating supply to withdrawn heating medium from said oven, said plurality of means corresponding in number to the number of zones, means connecting said plurality of means with said central source.

5. An oven, a plurality of separate means for withdrawing used heating medium from within the oven and mixing in predetermined proportions with fresh heating medium from a central source of supply and redelivering the combined heating medium within said oven, and means for automatically controlling the proportionate mixture.

6. An oven, means for recirculating the used heating medium from said oven, said recirculating means comprising a plurality of fans, mixing chambers connected to the intake of said fans, separate discharge ducts within the oven connected to the discharge side of each fan, conduits from within the oven to each mixing chamber, a central source of fresh heating supply exteriorally of said oven, means for delivering fresh heating medium from said central source of supply to said mixing chambers, means for thermostatically controlling the proportionate mixture of withdrawn and recirculated air by each fan to maintain predetermined temperature zones in said oven.

7. An oven, means for recirculating the used heating medium from said oven, said recirculating means comprising a plurality of fans, mixing chambers connected to the intake of said fans, separate discharge ducts within the oven connected to the discharge side of each fan, conduits from within the oven to each mixing chamber, a central source of fresh heating supply exteriorally of said oven, means for delivering fresh heating medium from said central source of supply to said mixing chambers, means for thermostatically controlling the proportionate mixture of withdrawn and recirculated air by each fan to maintain predetermined temperature zones in said oven, each of said fans, mixing chambers and recirculating conduits to said mixing chamber and delivery conduit to said ducts being alternately reversed to prevent side drift.

8. An oven, means for recirculating the used heating medium from said oven, said recirculating means comprising a plurality of fans, mixing chambers connected to the intake of said fans, separate discharge ducts within the oven connected to the discharge side of each fan, conduits from within the oven to each mixing chamber, a central source of fresh heating supply exteriorally of said oven, means for delivering fresh heating medium from said central source of supply to said mixing chambers, means for thermostatically controlling the proportionate mixture of withdrawn and recirculated air by each fan to maintain predetermined temperature zones in said oven, and means for eliminating side drift of the heating medium in said oven.

9. An oven, means for recirculating reused heating medium to said oven, said recirculating means comprising a plurality of separate units exteriorly of said oven, a central source of fresh heating medium, means for supplying said fresh heating medium to said recirculating units, means for automatically controlling the proportionate mixture of fresh and reused heating medium to provide independent zones of predetermined temperatures.

10. An oven, means for recirculating reused heating medium to said oven, said recirculating means comprising a plurality of separate units exteriorly of said oven, a central source of fresh heating medium, means for supplying said fresh heating medium to said recirculating units, means for automatically controlling the proportionate mixture of fresh and reused heating medium to provide independent zones of predetermined temperatures, means for exhausting to the atmosphere a portion of the used heating medium containing excess moisture and means for reheating the balance of the used heating medium not recirculated and exhausted.

11. An oven, a source of heating medium supply exteriorally of said oven and positioned on the top thereof for supplying high temperature fresh air, a plurality of means for recirculating a mixture of air withdrawn from said oven and said high temperature fresh air, the proportion of said mixture automatically controlled at each plurality of means.

RALPH BYRON.
HERMAN G. RAPPOLT.